United States Patent [19]
Valtchev et al.

[11] 3,922,516
[45] Nov. 25, 1975

[54] METHOD FOR PRODUCING PROTECTIVE COATINGS ON CARBON ELECTRODES

[75] Inventors: Alexander Jordanov Valtchev; Emil Pantaleev Minov, both of Sofia, Bulgaria

[73] Assignee: Metalurgitchen Zavod "Lenin", Pernik, Bulgaria

[22] Filed: May 2, 1973

[21] Appl. No.: 356,351

[52] U.S. Cl. .................. 219/76; 117/228; 219/123
[51] Int. Cl.² ........................................ B23K 9/04
[58] Field of Search ........ 219/76, 77, 123; 117/228

[56] References Cited
UNITED STATES PATENTS

| | | | |
|---|---|---|---|
| 2,411,893 | 12/1946 | Peters | 219/123 X |
| 3,348,929 | 10/1967 | Valtschev et al. | 219/76 X |
| 3,352,997 | 11/1967 | Butler | 219/123 |
| 3,513,283 | 5/1970 | Arnoldy | 219/76 X |
| 3,584,181 | 6/1971 | Nemoto et al. | 219/76 |

*Primary Examiner*—Bruce A. Reynolds
*Attorney, Agent, or Firm*—Karl F. Ross; Herbert Dubno

[57] ABSTRACT

Carbon electrodes, e.g. for electric-arc furnaces, are provided with protective coatings by initially metallizing the surface of an electrode by deposition of a metallic layer thereon, applying a metallic paste, and treating the coated surface with an electric arc while stabilizing the arc with a magnetic field such that the axis of the magnetic field substantially coincides with the axis of the arc-generating electrode.

3 Claims, 5 Drawing Figures

METHOD FOR PRODUCING PROTECTIVE COATINGS ON CARBON ELECTRODES

FIELD OF THE INVENTION

Our present invention relates to a method of and an apparatus for the coating of carbon bodies with metallic layers and to the production of such coatings on carbon bodies. More particularly, the invention relates to the production of coated carbon electrodes for use in electric-arc furnaces.

BACKGROUND OF THE INVENTION

It is known to provide two or more layers of a protective substance, e.g. metallic layers, upon carbon bodies to be subjected to high temperatures in, for example, an electric-arc furnace. The carbon bodies may be electrodes for such furnaces and the metallic coating may include aluminum.

In a prior-art technique for forming coated carbon bodies and especially aluminum-coated carbon electrodes for an electric-arc furnace, a coating composition is applied to the surface of the carbon body which is thereupon treated with an electric arc by passing a treating electrode along the surface and rotating the body to progressively fuse the coating material and intermittently bond the other carbon substrate. The electric arc used for this purpose is generally continuous and either the carbon body or the treating electrode is displaced axially to effect the relative displacement of the surface to be treated and the electrode. The arc played upon the coated surface of the body thus describes a band with turns which overlap or are contiguous so that a substantially continuous fusion of the coating material to the body is obtained.

Electric-arc treatment in this manner is slow by comparison to other coating systems which operate simultaneously over all portions of the surface and this is a significant disadvantage. To increase the output of the electric arc treatment, it is known to provide a number of coating heads or treating electrodes in relatively closely spaced relation and angularly or axially spaced about the workpiece. However, even this solution does not completely eliminate the problem since the arc current creates magnetic fields which influence the adjacent arcs; as a result, the arcs played upon the surface of the coated body are irregular and substantially nonuniform. The anode spot formed on the surface of the body at each arc, corresponding to the effective location of treatment, may thus be diverted from the desired position axially in line of the treating electrode and the resulting coating is non-uniformly bonded to the substrate, irregular in character and generally of lower quality than is desired. Such mutual influences of the coating arcs also have been found to produce pores in the coating which lead to early deterioration thereof, especially when the carbon body is an electrode for an electric-arc furnace and is subjected to the rigorous conditions prevalent in apparatus of this type.

OBJECTS OF THE INVENTION

It is the principal object of the present invention to provide an improved method of coating carbon bodies whereby the aforementioned disadvantages are obviated.

Another object of the invention is to provide a method of coating elongated and preferably cylindrical carbon bodies, such as carbon electrodes of an electric-arc furnace, with protective coatings which increase the useful life of the electrode in the presence of severe operating conditions normally tending toward breakdown of any protective coating upon such bodies.

It is a further object of our invention to provide a relatively high-speed method of coating bodies of the character described so as to obtain more uniform, pore-free protective coatings at relatively low cost and with a minimum of process-control steps or components.

It is yet another object of this invention to provide a system for the uniform and pore-free coating of a carbon electrode for an electric-arc furnace with a metallic composition.

It is, still further, an object of the invention to provide an improved apparatus for coating carbon bodies and especially elongated cylindrical carbon electrodes for an electric-arc furnace.

SUMMARY OF THE INVENTION

We have been able to attain the aforestated objects and to create coatings for carbon electrodes at high speed, with increased output and with improved coating quality, by carrying out the electric-arc treatment of the coated body at an arc-current intensity (amplitude) in excess of 600 amperes while controlling the arc by applying a magnetic field thereto via a coil arrangement which preferably has a magnetic axis coinciding with the axis of the treating electrode and the desired position of the arc and the anode spot. More particularly, the treatment is carried out at a current above 600 amperes (this parameter being critical) and the electrode and the workpiece are stepped relatively axially through an increment pitch of more than 10 mm per revolution of the workpiece (this parameter being critical) while stabilizing the electric-arc by means of an externally applied magnetic field. The term "externally applied magnetic field" is used herein to refer to a magnetic field generated by a magnetic member in proximity to the electric arc and distinct from the magnetic field generated by the arc itself.

As already indicated, the best results are obtained when the magnetic field has an axis which coincides with or is parallel to the axis of the treating electrode disposed laterally of the carbon body (electrode for an electric-arc furnace), and which normally lies along a radius of the treated body and is perpendicular to a tangent thereto at the anode spot region of the body. Still better results are obtained when the electric-arc treatment is carried out with an arc current of 1000 to 2500 amperes and the increment by which the electrode and workpiece are stepped is 13 mm or more.

According to a feature of the invention, the stabilizing magnetic field is provided by a coil surrounding the treating electrode and preferably coaxial therewith, the coil being energized by direct or alternating current. Surprisingly, the application of an alternating magnetic field in this manner (at a frequency of $50H_z$ or higher) does not function to destabilize the arc but rather performs, as does the direct-current magnetic field, an arc-stabilizing function.

We are aware that magnetic fields have been provided heretofore to control the arc of an arc-wielding system in which a pool of molten metal is deposited upon or formed on a substrate and even for plasma welding systems in which the main current flow results from ionization of a gas fed to a plasma torch. However, as far as we are aware, it has not been recognized that the use of a stabilizing magnet field along the axis of the desired path for an arc or the treatment of coated carbon workpieces may be effective to stabilize the arc and permit a number of electrodes in relatively close proximity to be used and thereby increase the rate of treatment of the body and the degree to which the coating is rendered coherent and bonded to the substrate in a given treatment time.

It has been found to be most advantageous to generate the stabilizing magnet field by passing all or most of the arc current through the aforementioned coil, or by conducting only a portion of the arc current therethrough.

According to another feature of the invention, the workpiece (especially a carbon electrode for an electric arc furnace) is treated with two or more electrodes generating treating arcs of a current in excess of 600 amperes and stabilized by respective magnetic fields, the parallel generally vertical bands thus formed having a width of at least 10 mm and preferably in excess thereof, the band width corresponding essentially to the increment or pitch of advance per electrode as noted above.

By using the higher current level noted above, i.e. a current amplitude of 1000 to 2500 amperes, totally unexpected and especially effective results are obtained. The adhesion of the coating to the carbon surface is substantially uniform over the entire surface and the action of each cathode spot remains substantially constant for the entire treatment so that a uniform and relatively straight electric-arc treatment is obtained. In fact with earlier electric arc treatments it has been necessary to incorporate materials with a high thermionic emissive characteristic in the composition to sustain a uniform coating arc and, with the present invention, such materials of high thermionic emissivity can be omitted from the coating. Other disadvantages of previous coating techniques are also obviated and it is possible to obtain coatings with a high aluminum content, e.g. 95 percent, without difficulty. The coating process is not sensitive to minor variations in the operating parameters and in fact current variations of a substantial degree, e.g. 20 percent, having a variation in the arc length of ±4 mm may be accommodated without difficulty. Since this insensitivity to the electrical parameters allows the use of ordinary welding rectifiers or motor-generator sets, the process is highly economical. The electrodes, during use, have 10 percent larger area at the arc-generating tips than the previous coating methods, thereby providing a saving of 5 percent with respect to supplementary electrodes. The coating has better resistance to oxidization than conventionally applied coatings and can withstand about 16 hours of exposure to the electric-arc furnace environment.

DESCRIPTION OF THE DRAWING

The above and other objects, features and advantages of the present invention will become more readily apparent from the following description, reference being made to the accompanying drawing in which.

SPECIFIC DESCRIPTION

Figure 5:
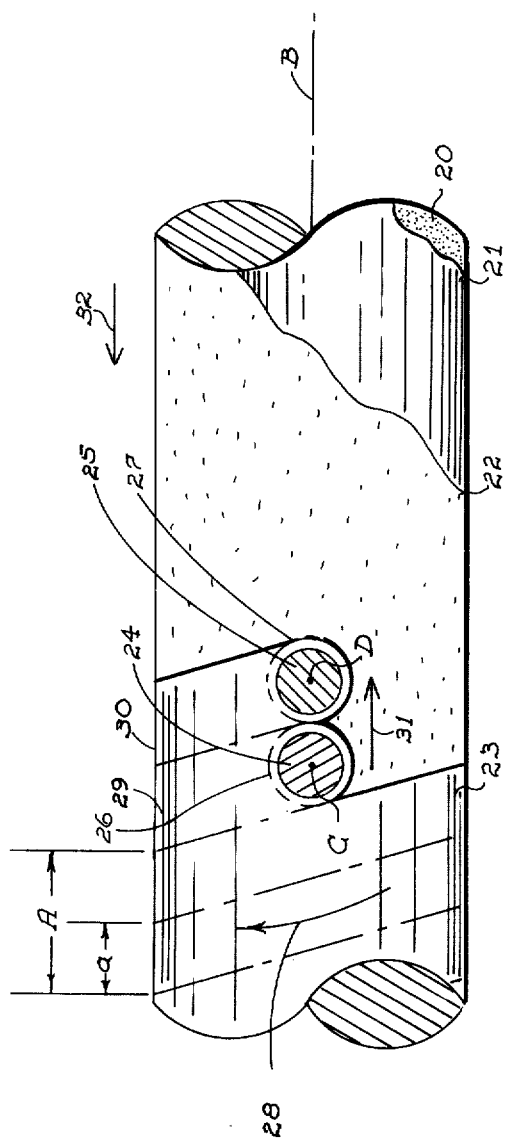
FIG. 5 is a diagram illustrating the principles of the present invention.

In FIG. 5, to which reference is made first in order that the nature of the invention may be more readily apparent, a carbon body 20, especially a graphite electrode for an electric arc furnace having a cylindrical configuration, is initially coated by flame-spray metallization to deposit molten aluminum and form a coating 21 which is substantially continuous. Upon this coating 21, there is applied a paste 22 of aluminum, elements capable of alloying therewith and fluxing materials as will be described in greater detail in the following specific examples.

This coating 22 is rendered coherent to form a continuous oxidation-resistant film 23, preferably containing 95 percent metallic aluminum or more, by treating the coating 22 with one or more electric arcs as will be described in greater detail hereinafter. The treating electrodes 24 and 25 are here shown to be relatively close together so that the anode spots 26 and 27 which, as the carbon electrode 20 is rotated (arrow 28) describe parallel traces 29, 30 in substantially contiguous relationship so that the fused coating 23 is continuous. The traces have, because they may not be discernible in the finished body, been represented by dot-dash lines in FIG. 5.

Figure 1:
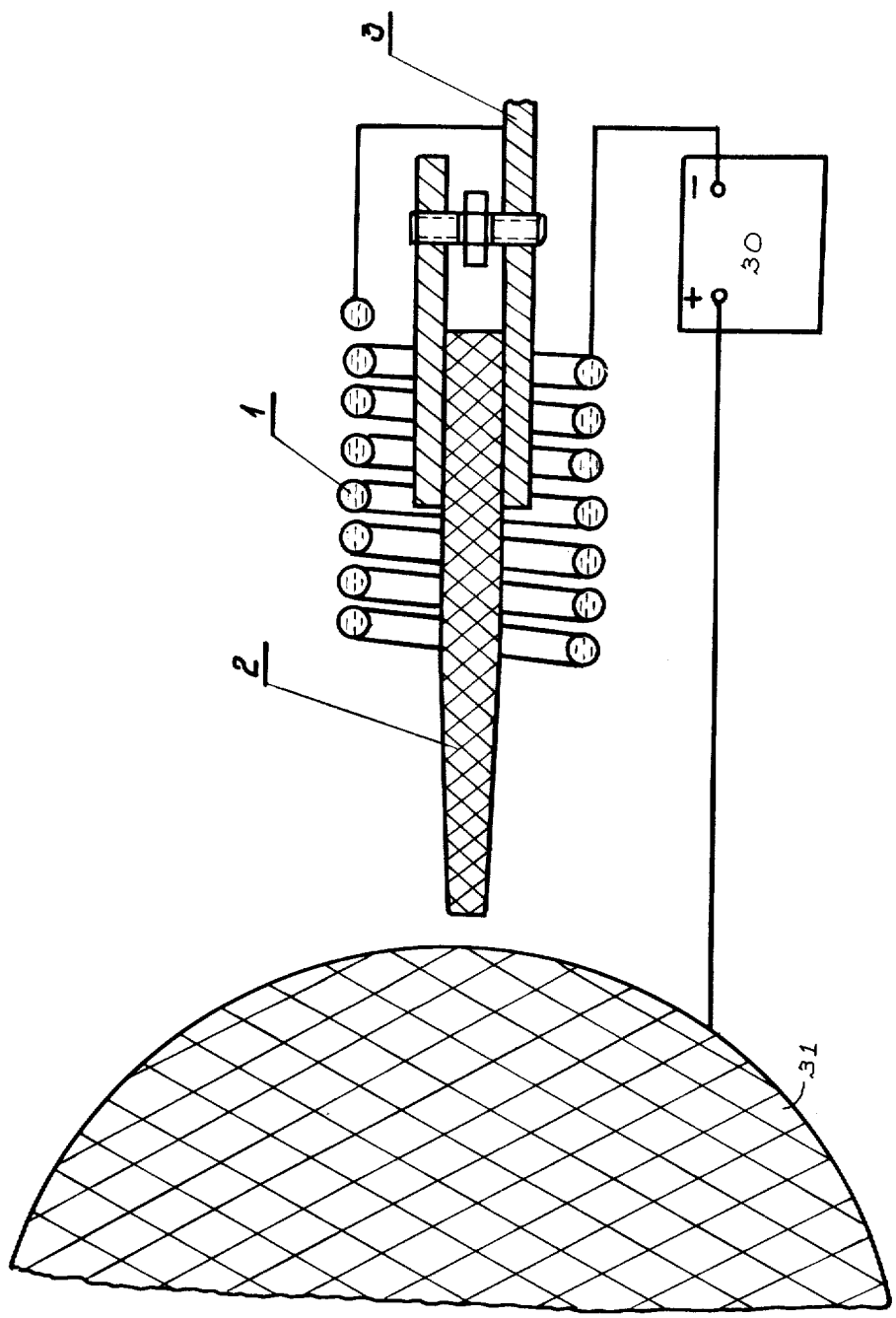
FIG. 1 is a diagrammatic cross-sectional view taken transversely to the cylindrical body to be treated illustrating the present invention.
Figure 2:
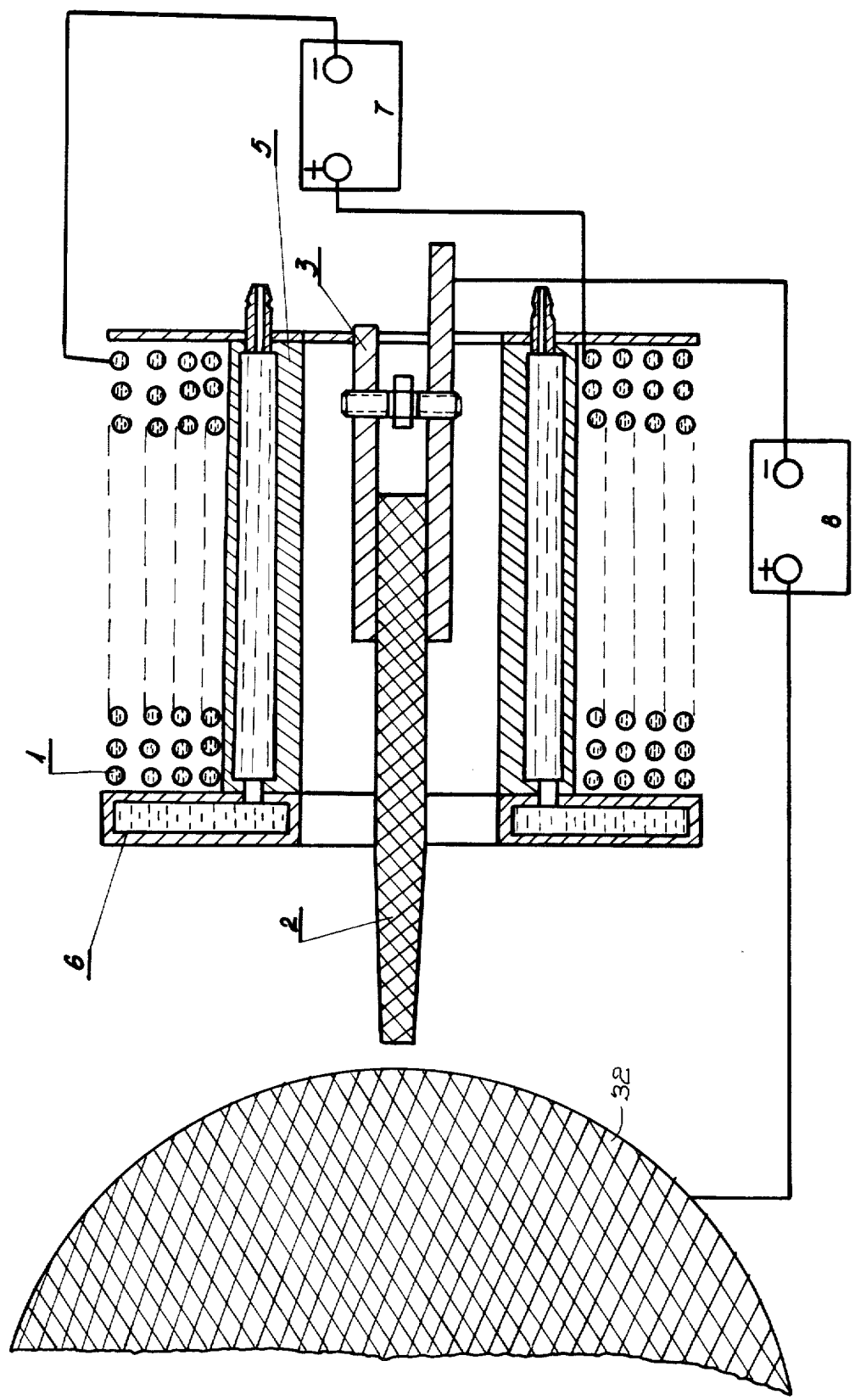
FIG. 2 is a view similar to FIG. 1 but illustrating another embodiment of the invention.

Each of the electrodes generates an arc (not seen in FIG. 5) which is stabilized by a magnetic field as shown in FIGS. 1 and 2 and the electrodes may be axially shifted (arrow 31) or the workpiece may be axially shifted (arrow 32) in step with the rotation of the electrode to advance the treating location by an increment $a$ per electrode of at least 10 mm and preferably a minimum of 13 mm. Since two electrodes are employed here, the total increment (or pitch) A per revolution is equal to $2a$ or at least 20 mm, but preferably a minimum of 26 mm. Of course, to accommodate the stabilizing coils, the electrodes 24 and 25 may be angularly spaced about the axis B of the workpiece. The axes C and D of the electrodes lie perpendicular to the surface to be treated and hence perpendicular to the plane of the paper in FIG. 5. Moreover, these axes preferably coincide with the axes of the stabilizing magnetic fields and the cathode spots 26, 27, coinciding also with the axes of the stabilized arcs. The electrodes may be spaced from the workpiece by a distance of 10 mm or more, preferably 13 mm and the arc current is preferably a minimum of 600 amperes, but advantageously 1000 to 2500 amperes.

In FIG. 1, we show a device for the electric arc treatment of a carbon electrode for an electric arc furnace which has been coated with a paste as previously described using a coil for stabilization which is traversed by the full arc current. In this case, the electromagnet is a solenoid 1 consisting of a helical coil traversed by water or cooling and coaxial with the treating electrode 2 retained in a holder 3. The electrode 2 and the coil 1 are electrically connected in series to a direct-current source 30, the positive pole of which is connected to the workpiece 31. In the embodiment of FIG. 2, the workpiece 32 is connected to the positive terminal of a direct current source 8 whose negative terminal is connected to the treating electrode 2 via its holder 3. In this embodiment, the coil 1 is energized by a source 7 other than the treating-current source 6.

The electromagnet of FIG. 2 comprises a hollow water-cooled iron core 5 around which the windings 1 are provided, the face 6 of the electromagnet confronting the workpiece being composed of a nonmagnetic material, e.g. copper or nonmagnetic austenitic steel, which also forms a chamber through which the cooling water is circulated. The treating electrode 2 and the electrode holder 3 pass generally axially through the coil, i.e. the coil and magnetic axes are parallel to the axis of the treating electrode.

The stabilization of the electric arc is a function of the magnetic field intensity and this is proportional to the current traversing the windings of each coil. The magnetic field intensity is also a function of the spacing between the end of the electromagnet and the arc and either the holder or the coil, in each embodiment, may be adjusted to obtain the desired degree of stabilization. Preferably the distance from the front side of the electromagnet to the surface of the carbon article is at least 5 mm greater than the distance of the treating electrode from this surface and up to 35 mm greater.

With an excessively strong magnetic field the arc may be extinguished and with too low a magnetic field the arc tends to meander.

Figure 3:
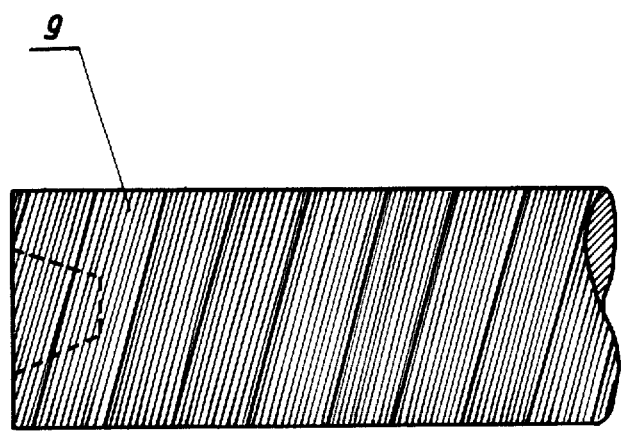
FIG. 3 represents an elevational view of a body in which the treatment is carried out using an arc stabilized with a magnetic field and at a treatment current of 1200 amperes.
Figure 4:
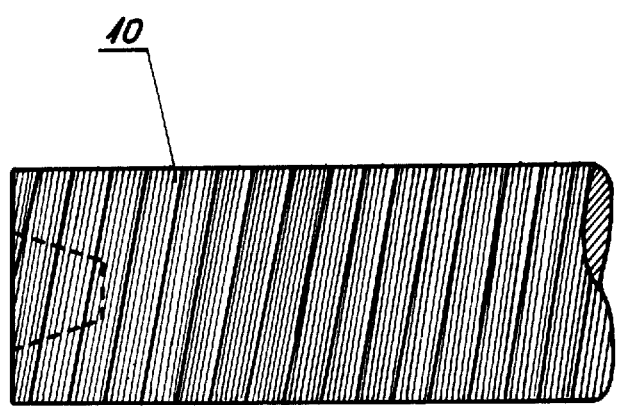
FIG. 4 is a view, for comparison with FIG. 3, of the electrode treated with an arc current of 350 amperes and not stabilized by a magnetic field.

As a result of the treatment, the electrode surface is formed with helicoidal bands of a width 9 equal to the increment by which the relative axial displacement of the treating electrode and the workpiece is effected. In FIG. 3 we have diagrammatically shown a treatment carried out with an increment of more than 10 mm (usually 12 to 15 mm) using an arc stabilized with a magnetic field as indicated while the treatment in FIG. 4 is carried out with an increment of about 6 to 8 mm. The nonstabilized coating thus provided is clearly inferior.

SPECIFIC EXAMPLE

EXAMPLE I

Using the device shown in FIG. 2, a cylindrical carbon body was treated with a carbon electrode with a peripheral speed of 11.2 mm/min., an axial increment of 13 mm and a treating current of 1250 amperes. The distance from the near side of the electromagnet to the surface of the carbon article was 14 mm, the electromagnet current was 150 amperes and the voltage was 8 volts.

The surface of the carbon article had been metallized by spraying 650 g of aluminum/m$^2$ from an electric arc spray gun, the metallized surface being coated with a paste consisting of 60 g/m$^2$ aluminum, 160 g/m$^2$ silicon carbide, 50 g/m$^2$ titanium dioxide and 20 g/m$^2$ boric acid. Prior to arc treatment, the carbon article was heated to 140°C.

A second coating is applied by spraying the arc-treated surface with 550 g/m$^2$ of aluminum and coating the latter with a paste of 60 g/m$^2$ aluminum, 70 g/m$^2$ silicon, 50 g/m$^2$ titanium dioxide and 20 g/m$^2$ boric acid. After drying, this new paste coating was electric-arc treated at a peripheral speed of 11.2 meters/min., with an axial increment of 13 mm and a current of 1300 amperes.

The second layer is metallized with 400 g of aluminum and coated with a paste of 40 g of graphite/m$^2$ and again subjected to electric arc treatment at a peripheral speed of 16.2 m/min., axial increment per revolution of 13 mm and a current of 750 amperes. Slight grinding is carried out to form the finished smooth surface.

EXAMPLE II

Using an apparatus of FIG. 2 and a magnetic field having the same characteristic described in EXAMPLE I, a coated carbon electrode is treated. First, however, the carbon surface is metallized by electric-arc spray deposition of metallic aluminum in an amount of 600 grams per m$^2$ upon the cylindrical surface of the carbon body. This surface is then arc treated at a peripheral speed of 11 m per minute with an axial increment per revolution of 12 mm and a treating current of 1150 amperes.

This arc-treated surface is again metallized, this time with 500 grams per m$^2$ of aluminum and is electric arc treated at a peripheral speed of 13.2 m per minute with an axial increment per revolution of 12 mm. The arc current is 1150 amperes.

This second layer is metallized with 700 grams per m$^2$ of aluminum and 200 grams per m$^2$ of copper and then arc treated to form an alloy coating at a peripheral speed of 13.2 m per minute, an axial increment per revolution of 11 mm and a treating arc current of 11.50 amperes. Light grinding is carried out to smooth the variation.

EXAMPLE III

The apparatus illustrated in and described with reference to FIG. 1 is employed and the magnetic field is generated at a coil spaced about 30 mm from the face to be treated. The current through the coil is 1000 amperes and the voltage drop across the solenoid is 3 volts.

The surface of the carbon article is metallized by electric arc spray deposition at 700 grams of aluminum per m$^2$ and this aluminum layer is coated with a paste of 80 grams per m$^2$ aluminum, 120 grams per m$^2$ silicon carbide and 30 grams per m$^2$ of boric acid. The carbon article is heated to 120°C and is electric arc treated at a peripheral speed of 18.3 m per minute with an axial increment of 14.5 mm per revolution and an arc current of 1000 amperes.

The arc-treated surface is metallized with 600 grams per m$^2$ of aluminum and again treated with the electric arc using magnetic stabilization. The arc treatment is carried out at a peripheral speed of 15.0 m per minute, an axial increment per revolution of 13.0 mm and a current of 1700 amperes.

This second layer is provided with a coating of 500 grams per m$^2$ of aluminum and is ground smooth. In practice it is found that under the aforedescribed conditions, the electric arc treatment can be carried out much more rapidly by than with a non-stabilized arc and with far more effective coating then has been attainable heretofore. In each case the coating is applied in a band having a width in excess of 10 mm.

We claim:

1. A method of producing a coated carbon article, comprising the steps of applying aluminum coating material to a surface of a carbon article; sweeping a continuous electric arc across the surface coated with said material with an arc current of 1000 to 2500 amperes and a spacing between increments of passage of the arc over said surface of about 13 mm; and applying a magnetic field to said arc while sweeping same across said surface to stabilize the arc, said magnetic field having an axis substantially perpendicular to said surface and parallel to said arc and being generated by passing current through a coil substantially coaxial with said arc.

2. The method defined in claim 1 wherein said magnetic field is produced by passing an electric current through a coil substantially coaxial with said arc and independent of the arc-forming current.

3. A coated carbon article as made by the method defined in claim 1.

* * * * *